United States Patent [19]

Applequist et al.

[11] 4,418,369
[45] Nov. 29, 1983

[54] METHOD AND STRUCTURE FOR MAINTAINING A LOW CONTAMINATED ENCLOSURE

[75] Inventors: Roy A. Applequist, Windsor, Calif.; Richard M. Altobellis, Jamestown; Robert F. Hoppe, Longmont, both of Colo.

[73] Assignee: MiniScribe Corporation, Longmont, Colo.

[21] Appl. No.: 260,494

[22] Filed: May 4, 1981

[51] Int. Cl.³ .................. G11B 23/02; G11B 25/04
[52] U.S. Cl. ................................................ 360/98
[58] Field of Search .................... 360/97–99, 360/133, 86; 206/444

[56] References Cited

U.S. PATENT DOCUMENTS

| | | | |
|---|---|---|---|
| 3,731,291 | 5/1973 | Walsh | 360/98 |
| 4,054,931 | 10/1977 | Bolton et al. | 360/97 |
| 4,130,845 | 12/1978 | Kulma | 360/98 X |
| 4,280,155 | 7/1981 | Scott et al. | 360/98 |
| 4,282,554 | 8/1981 | Ho et al. | 360/97 |
| 4,329,722 | 5/1982 | West . | |

OTHER PUBLICATIONS

IBM/TDB vol. 11, No 8, Jan. 1969, p. 951.

*Primary Examiner*—John H. Wolff
*Attorney, Agent, or Firm*—Curtis, Morris & Safford

[57] ABSTRACT

A ventilation and filtration system and method for an enclosure isolating a memory device spinning disk mechanism from airborne contaminants in which a vent through a remote filter from the ambient atmosphere is positioned with one opening adjacent the center portion of the spinning disk whereby the enclosure is vented through the filter to the ambient pressure at a location at substantially the lowest pressure within the enclosure as a result of the air pumping action of the spinning disk to thereby over pressurize the remainder of the enclosure and minimize unfiltered leaks of outside air into the enclosure.

11 Claims, 3 Drawing Figures

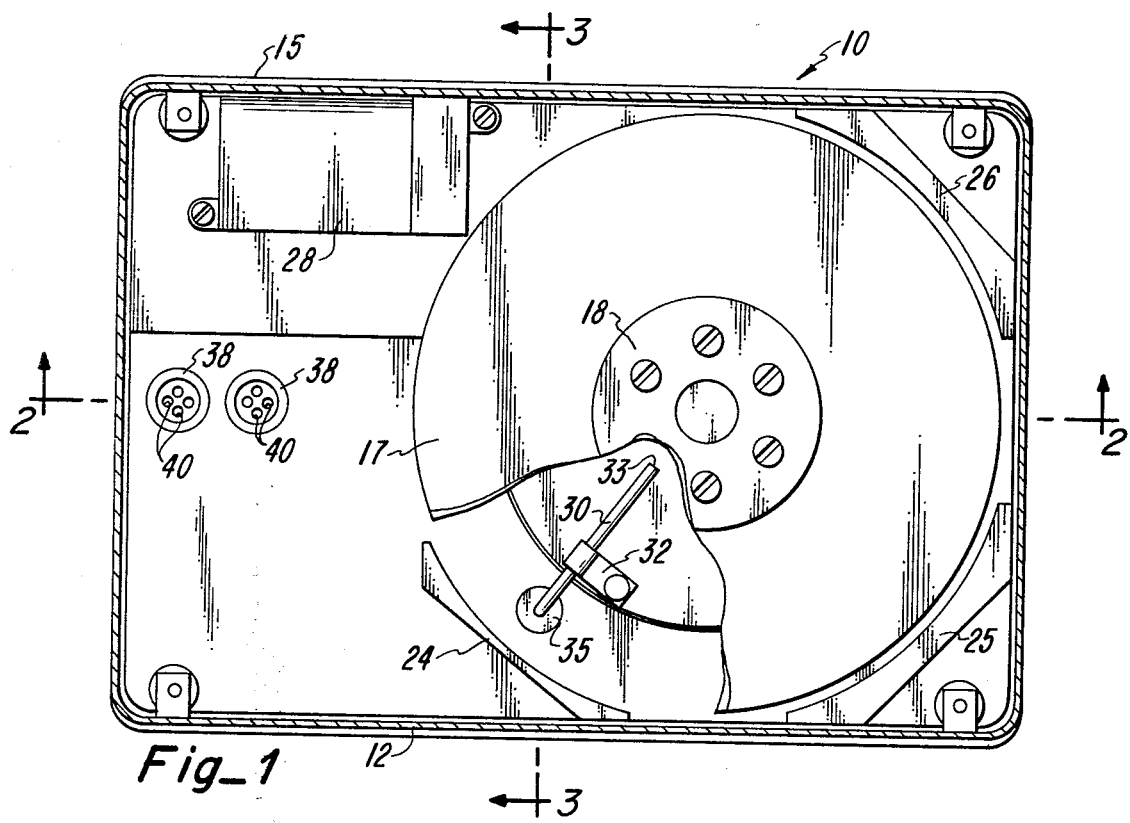
Fig_1
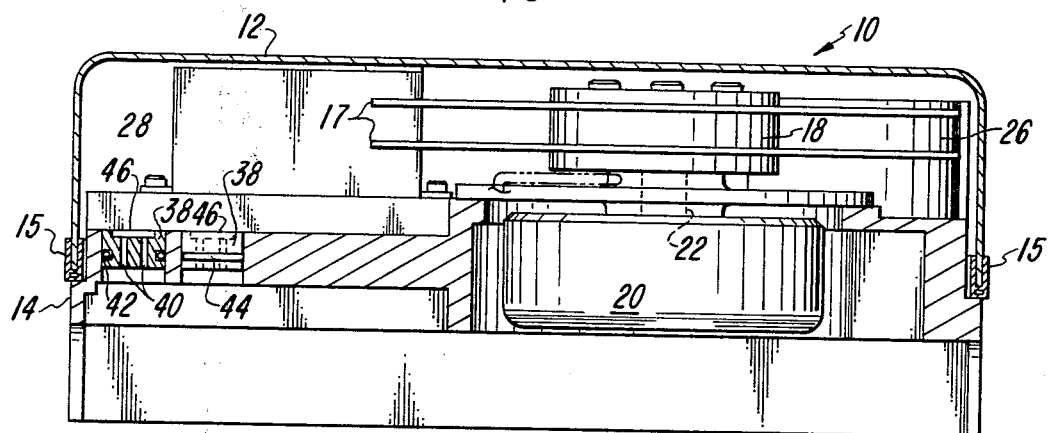
Fig_2
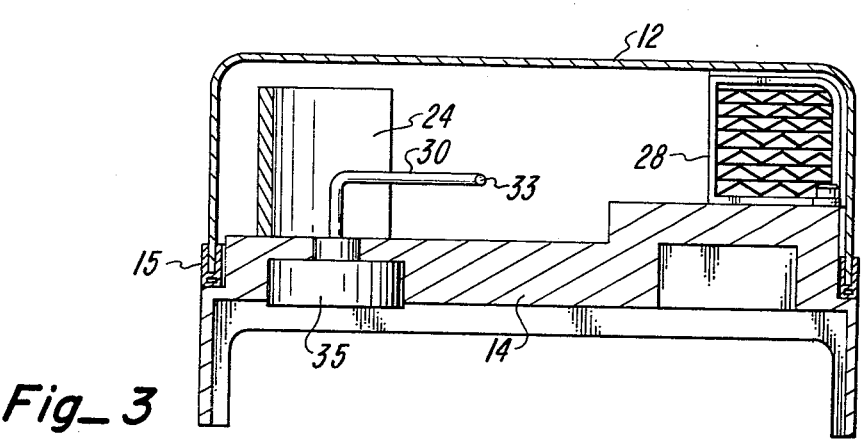
Fig_3

METHOD AND STRUCTURE FOR MAINTAINING A LOW CONTAMINATED ENCLOSURE

BACKGROUND OF THE INVENTION

1. Field of the Invention

This invention relates generally to devices in which spinning disks are maintained in a contaminant free environment, such as Winchester Drive mechanisms, and more particularly to an improved structure and method for dynamically maintaining the integrity of the enclosure with regard to leakage of contaminated air into the enclosure.

2. Description of the Prior Art

As is well known, the so-called Winchester Drive disk storage system for computer data is one of the more effective and efficient means of providing dense storage and rapid access. Such advanced forms of memory storage utilize a flying head, which is maintained at a distance on the order of 0.5 to 1 microns above a magnetic oxide coating carried on an aluminum substrate, with the oxide coating rotated past the flying head to maintain the clearance as a function of an air layer carried by the disk. Such submicron dimensions while providing for dense recording of data upon the disk concurrently required clean room conditions. For instance, a small smoke particle or fingerprint smudge may often be an order of magnitude greater than the clearance between the flying head and oxide coating, thus precipitating a crash of the head relative to the rotating disk if carried into the smaller gap between the head and disk. Simple dust particles consitute massive interference for purposes of Winchester Drive mechanisms.

Winchester Drive mechanisms are, of course, manufactured under clean room conditions. The disk and head mechanisms are enclosed for protection from normal contaminated working environments. In the larger and more expensive disk devices, involved filtering and other such support systems for the operating environment are provided. However, in the smaller variations of the Winchester Drive mechanism available, i.e., those with the smaller disks which are intended for use with smaller, less expensive installations, simpler provisions must be made to protect the clean environment.

Typically, the more basic devices utilize an air circulation system in which the spinning disk flows air around the periphery of the enclosure. The enclosure is sealed, and an internal filter is positioned in the circulation flow induced by the spinning disk to entrap contaminants. Ventilation to the ambient atmosphere has, at least in a more popular embodiment, been wherever a bulky filter could be positioned, i.e., not at the spindle because of space limitations, such that contaminants passing through various unavoidable leaks into the enclosure would be caught up in the internal circulation until trapped by the internal filter. Contaminants entering at leaks into the enclosure would thus circulate within the enclosure with the possibility of coming to rest upon the spinning disk, with the above described serious results.

SUMMARY OF THE INVENTION

According to the instant invention, the enclosure protecting the spinning disk of, for instance, Winchester Drive mechanisms, are ventilated through a filter to the ambient atmosphere at a location adjacent the axis of rotation of the disk to establish ambient pressure at a relatively low pressure portion of the enclosure, and thereby positively pressurize the remainder of the enclosure relative to ambient pressure such that leakage will be from within the enclosure to the ambient atmosphere. A simple conduit member communicating through a filter with the ambient atmosphere and positioned with the interior outlet of the conduit adjacent the spindle mechanism of the disk provides the desired results. Preferably the remainder of the enclosure is tightly sealed—with the understanding that sealing against very small particles of the submicron size is extremely difficult—and includes novel seal members around, for instance, wiring communicating between the enclosed volume and the outside ambient atmosphere.

Accordingly, an object of the present invention is to provide a new and improved structure and method for maintaining a low contaminant atmosphere within the enclosure of a disk memory device.

Another object of the present invention is to provide a new and improved structure and method for minimizing pressure differences across the spindle seal of a Winchester Drive type mechanism.

Still another object of the present invention is to provide a new and improved structure and method for sealing wires extending between the enclosed, sealed volume of a memory device and the contaminated outer atmosphere.

These and other objects and features of the present invention will become apparent from the drawings and following description.

BRIEF DESCRIPTION OF THE DRAWINGS

In the drawings:

FIG. 1 is a sectioned top view of an apparatus in accord with the instant invention with the disk partially cut away to illustrate the novel venting arrangement;

FIG. 2 is a sectioned view generally along section line II—II of FIG. 1; and

FIG. 3 is a sectioned view generally along section line III—III of FIG. 1.

DETAILED DESCRIPTION OF THE INVENTION

Turning now to the drawings, wherein like components are designated by like reference numerals throughout the various figures, a disk memory device in accord with the instant invention is illustrated in FIGS. 1, 2 and 3 and generally designated by reference numeral 10. As shown in these figures, disk memory device 10 includes an upper enclosure 12 attached to base member 14 by seal 15 such that an enclosed volume is defined and protected from the ambient surroundings. Within the enclosed volume a plurality of magnetic oxide coated disks 17 are shown mounted for rotation on spindle 18. Spindle 18 is in turn driven by motor 20 through shaft 22. Positioned adjacent disks 17 are air flow guides 24, 25 and 26 such that rapid rotation of disks 17 in, as illustrated in FIG. 1, a counterclockwise direction will induce a flow of air away from spindle 18 towards enclosure 12, and generaly in a counterclockwise flow direction within enclosure 12. Positioned within enclosure 12 and adjacent the flow stream from disks 17 is filter 28 such that particles carried by the airstream will be removed from the airstream as a result of the flow induced by the spinning of disks 17.

As a result of seal 15, enclosure 12 and base 14 form an essentially hermetic enclosure around disks 17, which requires venting to the surrounding atmosphere to avoid deleterious pressure differences due to normal changes in barometric pressure, altitude change, etc. Of particular importance with respect to the instant invention is conduit 30 secured by brace 32 which, at outlet 33, communicates with the interior of the volume defined by enclosure 12 and base 14, and, through remote filter 35, communicates with the ambient atmosphere. It is to be noted that outlet 33 is positioned adjacent spindle 18 which would not be practical with filter 35 per se and thus, as a result of the tendency of disks 17 and spindle 18 to function as a centrifugal pump, is located at substantially the lowest pressure volume within the volume defined by enclosure 12 and base 14. Filter 35 may be removably mounted, for instance, by an O-ring in an annular groove (not shown). Since conduit 30 also communicates with the ambient atmosphere, two significant purposes are concurrently served. Of prime importance is the establishment of the ambient pressure at a crowded low pressure position within the volume surrounding disks 17, thereby causing the remainder of the volume defined by enclosure 12 and base 14 to be at a pressure somewhat above ambient pressure. This provides for a flow at inadvertent leak points, for instance at seal 15, from within the enclosed volume to ambient atmosphere. Further, since a seal is required at the position at which shaft 22 passes through base 14, minimum pressure difference across such seal is produced since the pressure adjacent outlet 33 is at ambient pressure, and the motor side of shaft 22 is also at ambient pressure.

In operation, rapidly spinning disk 17 and spindle 18 tend to throw air away from spindle 18 and, as a result of air flow controlled by guides 24, 25 and 26, from spinning disk 17 into filter 28. This generates a relatively low pressure volume adjacent spindle 18. Conduit 30, being vented to the ambient atmosphere, establishes ambient pressure at this relatively low pressure position, thereby at least modestly over pressurizing the remainder of the volume defined by enclosure 12 and base 14. This in turn causes any inadvertent leaks to be from such volume to ambient atmosphere, and concurrently minimizes the pressure difference across the necessary seal at the position where shaft 22 passes through base 14. Of course, by providing a somewhat elevated pressure elsewhere through the volume, all movement of air from the ambient atmosphere into the volume must be through conduit 33. Filter 35 is provided to prevent the introduction of contaminents through conduit 30.

In order to maintain the integrity of the volume defined by enclosure 12 and base 14 from inadvertent contamination, it is preferred that sealing members 38 be provided to permit wiring from outside the volume to connect to, for instance, read/write heads (not shown) and electronic components within such volume. As shown in FIGS. 1 and 2, cylindrical sealing components 38 include openings 40 defined axially therethrough to permit the passage of wires (not shown) from a position outside of such volume to the interior of such volume. With particular reference to FIG. 2, it will be recognized that an annular groove 42 is formed in sealing member 38 in which O-ring 44 is positioned to provide a secure seal between base 14 and sealing member 38. Further, at at least one end surface of sealing member 38 an indent 46 is defined to receive a potting composition (not shown) to thus seal tightly around the wires which may pass through openings 40. As a result of such potting composition in indent 46, and the sealing effect of O-ring 44 between each sealing member 38 and base 14, excellent air flow isolation concurrent with the communication of wires from the exterior of base 14 to the defined interior volume may be accomplished.

In summary, the instant invention pertains to a particular structure and method for venting the interior of sealed volumes containing spinning disks, such as in Winchester Drive devices. A low pressure volume is produced adjacent the spindle of the spinning disks as a result of the centrifugal pumping action of the disks. By locating a conduit at such low pressure volume and communicating with the ambient atmosphere through a remote filter, the low pressure volume can be maintained at ambient pressure, thereby establishing a pressure somewhat above ambient in the remainder of the enclosure. This causes any leaks to be from the enclosed volume to the ambient atmosphere rather than in the opposite direction. Since space is limited at the low pressure volume, the conduit permits the use of a relatively large remote filter effectively vented in the confined low pressure volume. In a particularly preferred embodiment, sealing members are provided to allow wires to extend from the ambient atmosphere into the enclosed volume.

Although only limited preferred embodiments of the invention have been specifically illustrated and described, it is anticipated that various changes and modifications will be apparent to those skilled in the art, and that such changes may be made without departing from the scope of the invention as defined by the following claims.

What is claimed is:

1. In a memory storage device including a base and an enclosure substantially sealed to said base to define a volume, at least one disk mounted for rotation about a spindle passing through said base to the enclosed volume, and a spindle seal between said spindle and said base, the improvement comprising:
   a ventilation opening defined from the enclosed volume through the enclosure to the surrounding ambient atmosphere with one end of the ventilation opening within the enclosed volume being position adjacent said spindle seal and the other end of the ventilation opening communicating with the surrounding ambient atmosphere to supply ambient pressure adjacent said spindle seal, resulting in substantially no pressure difference across said spindle seal;
   whereby upon spinning the disk and spindle a relatively low pressure volume substantially equal to ambient pressure will be generated within the enclosure volume adjacent the spindle seal at the location of the opening of the ventilation opening thereby causing the remainder of the enclosed volume to be maintained at a pressure above the surrounding ambient atmospheric pressure.

2. An enclosed memory storage device as set forth in claim 1 in which the ventilation opening comprises a conduit member extending through the enclosure.

3. An enclosed memory storage device as set forth in claim 2 in which the conduit communicates with the surrounding atmosphere throu a filter attached thereto at a position remote from the opening adjacent the spindle.

4. An enclosed memory storage device as set forth in claim 1 in which a plurality of axially spaced disks are rotated.

5. An enclosed memory storage device as set forth in claim 1 in which the enclosure also includes within the enclosed volume an internal filter positioned adjacent the disk to entrap contaminants within the enclosure in the internal circulation flow pattern induced by the rotating disk.

6. An enclosed memory storage device as set forth in claim 1 in which at least one cylindrical sealing member is positioned within cylindrical openings defined through the enclosure, the cylindrical sealing member having at least one opening defined in an axial direction therethrough to accommodate wires passing through the enclosure, a circumferential groove defined in the sealing member, an O-ring positioned in the circumferential groove and adapted to seal between the sealing member and the cylindrical opening defined in the enclosure, and an indent defined in at least one end of the sealing member and including the opening through which wires are adapted to pass.

7. An enclosed memory storage device as set forth in claim 6 in which at least one wire extends through the openings in the sealing member and in which a potting composition is adhered to the wires and the sealing member at the indent.

8. In a memory storage device including a base, a spindle rotatably mounted on a shaft extending through the base, a seal between said base and said shaft, a motor driving the shaft, a plurality of disks mounted for rotation on the spindle, and an enclosing member mounted to the base to define a volume surrounding the spindle and disks, the improvement comprising:
   a ventilation channel defined through one of the base and the enclosing member, the channel opening at one end adjacent the seal and at the other end being in communication with the surrounding ambient atmosphere to supply substantially ambient pressure adjacent the seal thereby supplying substantially equal pressures across said seal, and
   a filter remote from the opening adjacent the seal connected to the ventilation channel between the surrounding ambient atmosphere and the opening adjacent the seal.

9. A memory storage device as set forth in claim 8 in which the ventilation channel comprises a conduit member extending through the base.

10. A method for isolating and ventilating rotating disks in an enclosure of an enclosed memory storage device, the method comprising:
   rotating at least one disk mounted for rotation on a journaled spindle within a enclosed and substantially sealed volume;
   providing a seal between ambient and said enclosed volume at said journaled spindle;
   inducing a circulation of air and differing pressure within the enclosed volume as a result of the pumping action of the rotating disk;
   conducting air at ambient pressure through the enclosure to the enclosed volume adjacent said seal; and
   supplying ambient pressure to the enclosed volume at the position adjacent said seal to provide substantially no pressure differential across said seal while the pumping action of the rotating disk and spindle induces a greater pressure at the remainder of the enclosed volume.

11. A method for isolating and ventilating a memory storage device as set forth in claim 10 in which the air conducted through the enclosure is first passed through a filter spaced from the rotating spindle prior to flowing within the enclosed volume.

* * * * *